Patented Oct. 28, 1941

2,260,897

UNITED STATES PATENT OFFICE 2,260,897

SEASONING MATERIAL DERIVED FROM RED PEPPERS AND THE DERIVATION THEREOF

Carroll L. Griffith and Lloyd A. Hall, Chicago, Ill., assignors to The Griffith Laboratories, Inc., a corporation of Illinois No Drawing. Application November 27, 1939, Serial No. 306,410

12 Claims. (Cl. 99—140)

This invention relates to a substantially non-acide oleoresinous concentrate of red peppers, and more particularly to an alkaline oleoresinous concentrate of red peppers which has the stable red color, the natural red pepper taste and odor, and retains the natural strong bite thereof.

Red peppers are frequently used as a food seasoning or ingredient because of the red color, the strong bite, and the zestful natural red pepper taste and odor. There are however, certain objections to the use of ground red peppers and commercially the extractable oleoresinous content thereof has been removed and sold as oleoresin of capsicum. This material, however, if prepared in a form which retains the natural color and strong bite, has been characterized by a very objectionable taste and odor which is perhaps best described as "medicinal." Moreover, even the best of oleoresin of capsicum is unsatisfactory from the standpoint of color stability. There was on the market, prior to the present invention, no satisfactory oleoresinous extract of red pepper.

The product known commercially as oleoresin of capsicum was prepared by acetone extraction from the peppers after which the acetone was removed by distillation. The resulting product was a dark red viscous material with an intensely hot and pungent taste, the extent of which measured the so-called "bite" of the substance. The material had a pH, after removal of the acetone in the neighborhood of 2.7 to 4.1, and prior to the removal of the acetone of around 4.6, or somewhat above. It was characterized by the presence of the highly undesirable medicinal taste and odor already referred to.

It has now been discovered that the acidity of the oleoresinous extract contributes to the development of the undesirable medicinal taste and odor, apparently because hydrolysis of natural esters or other ingredients into acids has taken place.

Commercial oleoresin of capsicum is prepared by grinding the dried red peppers to 20 mesh and then extracting the oleoresin from a large batch of the material. For example, in a suitable process, a batch of some 5,000 lbs. of the peppers is placed in an extracting apparatus and the peppers covered with acetone, the liquid usually extending an ample distance above the top of the peppers. The product is then macerated and cooked for 48 hours in a reflux apparatus at a temperature just below boiling. The acetone is then drained off and the product washed with additional acetone, the washings being added to the main body of liquid. This material had a pH of around 4.6.

In prior processes the solvent was then removed by evaporation. The oleoresin which was left in the still was a dark red viscous material with an intensely hot and pungent taste, the extent of which measured the so-called "bite" of the substance. The product contains fatty oils, essential oil, resins, and the active hot or pungent principles which are capsicin and capsaicin. The investigations upon which the present invention is based indicate that the fatty and resinous matters are largely responsible for the seasoning imperfections previously described.

It has now been discovered that the medicinal taste may be completely removed without affecting the color or bite of the material by substantially neutralizing the extract with a mild alkaline agent prior to the removal of the solvent. In carrying out the invention the acetone extract prepared by combining the drains and the washings from the extraction process hereinbefore described is treated with a mild alkaline agent to produce a neutral solution and the solvent is then removed.

If desired, the alkaline agent may be added to the extract at an earlier stage, for example, prior to the reflux cooking operation. There is some indication that the presence of the alkali during this step of the process is of value in improving the product, but it is by no means necessary in the production of a naturally colored and naturally tasting material.

In removing the solvent it has also been found desirable to evaporate in the presence of a finely divided edible absorbent agent, and preferably under conditions where the moisture content of the product is closely controlled. The value of such a procedure lies primarily in the production of a seasoning base which is more readily dispersed or distributed. At the same time the evaporation of the solvent in the presence of the absorbent base material is of value in the production of a stable compound.

The oleoresinous concentrate itself, however, when prepared from a neutralized extract in accordance with the present process combines readily with the absorbent base under ordinary mixing conditions. Being more concentrated, however, it is somewhat more difficult to disperse it uniformly upon the absorbent material in those instances where such dispersion is desired.

Where an absorbent agent is utilized it is preferably a sugar such as fine granulated cane or corn sugar. The corn sugar product commonly known as cerelose, which is commonly supplied in unground crystals of rather generally minute size, is highly desirable. Other absorbent agents such as flour, gelatinized flour, starches, sodium chloride, and other well known vehicles may likewise be employed singly or in admixture.

The extract may be neutralized by any one or more of a considerable number of alkalies, substantially any alkali which does not interfere with the edible character of the product being suitable.

For example, soda ash, sodium bicarbonate, the various alkaline sodium phosphates, potassium carbonate, potassium bicarbonate, sodium metasilicate and triethanolamine, may be employed. Alkalinity and an excess of the useful neutralizing agents are preferred for the invention, in order to secure an oleoresinous concentrate in which the pH is above 7, and the mild alkalies or alkaline buffing salts are preferred in order to prevent the excess of the neutralizing agent creating a pH above 8.5. Any anti-acid agent is useful as long as it is reactive in the process to neutralize the natural acid of the red peppers or any acid formed in the extraction of red peppers, to form a neutralization product which is not deleterious to the resulting oleoresinous concentrate for its intended uses.

As an example of the invention, fluid acetone extract of capsicum containing about 10% by weight of oleoresin of capsicum and 90% of acetone is treated with a mild alkaline agent, preferably a 10% aqueous solution of sodium bicarbonate or a 50% aqueous solution of triethanolamine to bring its pH to about 7.5. Cerelose is then added in a rotary vacuum dryer to the solution, preferably at a ratio of 500 lbs. of corn sugar to 68¾ lbs. of the adjusted acetone extract. As already stated, the cerelose occurs in a fine unground, rather flaky form. The materials are mixed in the rotary dryer for several minutes until they are uniformly distributed, after which the vacuum pump is started to produce a vacuum of about 28" and a vacuum is then continuously maintained upon the materials until the process is completed. Preferably the dryer is connected in the usual fashion to a solvent recovery apparatus in which the acetone is condensed and collected for re-use.

The dryer is heated in any suitable fashion, for example, by a steam jacket, until the temperature on the inside of the dryer is about 120° F. The temperature is gradually increased to 140° F., the increase being accomplished in about fifteen minutes. As the temperature increases the vacuum drops to about 22" and then gradually increases again as the solvent is removed, until it reaches about 28".

An upper limit of 160° F. should be observed, and preferably the temperature should not go above 145° F. because there is an appreciable loss in strength above that point. The vacuum drying equipment employed is preferably either regular rotary drying vacuum equipment or pan drying vacuum equipment, and any suitable form of solvent recovery equipment may be used.

After the drying operation is complete, the product is in the form of a powder. The corn sugar or other absorbent base is in its original condition, but owing to the contact with the large quantities of liquid, the capsicum has become uniformly distributed thereon and the process firmly and thoroughly fixes the seasoning therein. Fixative oils, such as are commonly employed in other solid seasonings are unnecessary, but, of course, may be employed if desired.

The preferred ratio of capsicum to sugar in the finished product is about 3.75 oz. of the oleoresin of capsicum to 16 lbs. of sugar. The proportions may be altered, however, to give as little as 1 oz. per 16 lbs. of sugar (0.4%) or as much as 8 oz. for 16 lbs. of sugar (approximately 3.1%).

As an example of the process, as carried out without the addition of an absorbent base to the extract during removal of the solvent, an oleoresinous extract of red peppers was prepared in the same manner as heretofore described by extraction with acetone. The acetone extract was then alkalized with triethanolamine to a pH of 8.1. The acetone was removed under the conditions of temperature heretofore specified, during which time the pH of the concentrating oleoresinous material remained at 8.1, although the acetone distillate had a pH of 7.3.

The resulting concentrate was free from medicinal taste and odor, had a stable color and natural pungency or bite.

When this concentrate was added to an absorbent base it formed a stable composition which required no fixative oil.

The seasoning product prepared by either method herein described may, of course, be incorporated with other seasoning materials, either essential oils, solid materials, or with intermediate products employed in seasoning meats, pickles, bakery products, etc.

The product prepared in accordance with this invention will retain its color indefinitely, will not develop the customary undesirable medicinal taste or odor, but at the same time the "bite" of the capsicum is likewise maintained.

The pH values given in the foregoing specification were determined by the Beckman hydrogen ion meter which employs a potentiometer system in which the voltage of the electrode is balanced against the standard cell. The circuit balance is indicated by a specially designed amplifier which gives continuous readings without drawing appreciable current from the electrodes. The device includes a temperature compensator which gives automatic temperature compensation effects of the entire pH range measured. The device is designed to measure the pH's from 0 to 12.5 and to be accurate at temperatures of 10° to 40° C. The electrode system consists of a glass electrode and a saturated calomel electrode.

The term "non-acid" as employed in the claims indicates a pH of at least approximately 7, as determined in the foregoing manner.

This application is a continuation-in-part of our co-pending application, Serial No. 219,098, filed July 13, 1938.

The foregoing detailed description has been given for clearness of understanding only, and no unnecessary limitations should be construed therefrom.

We claim:

1. The process of preparing an oleoresinous concentrate of red peppers which comprises heating below 160° F. a red pepper extracted oleoresinous solution in a volatile solvent to remove solvent and continuing the heating until the volatile solvent is removed, alkaline material having been added to material included in the solution at least substantially sufficient to neutralize the same, prior to any substantial heating of the solution.

2. The method as set forth in claim 1, in which the temperature is maintained below 145° F.

3. The process of preparing an oleoresinous concentrate of red peppers which comprises extracting the oleoresin from red peppers with a volatile organic oleoresin solvent, evaporating the resulting extract at a temperature below 160° F. to leave an oleoresinous concentrate, and prior to evaporating said solvent adding neutralizing material in neutralizing quantity to provide a substantially non-acid concentrate.

4. The method which comprises neutralizing an oleoresinous extract of red pepper in a volatile solvent with a non-toxic, mild, alkaline agent to produce a pH of 7.0 to 8.5 therein, mixing the solution with a great excess of a finely divided edible absorptive agent, heating the mixture below a temperature of 160° F., and continuing the heating until the material is free from solvent to produce a stable, dry, finely divided seasoning.

5. The method as set forth in claim 4, in which the alkaline material is of the class consisting of soda ash, sodium bicarbonate, potassium carbonate, potassium bicarbonate, sodium metasilicate and triethanolamine.

6. The method as set forth in claim 4, in which the absorptive medium is a sugar.

7. The method as set forth in claim 4, in which the absorptive medium is corn sugar.

8. The method as set forth in claim 4, in which the temperature is not permitted to exceed 145° F.

9. The method which comprises mixing a finely divided edible carrier base with a non-acid solution of the oleoresinous extract of red peppers in a volatile organic extracting solvent including also the product of neutralizing with neutralizing material acid derived from red peppers, and heating the mixture at a temperature below 160° F. to remove substantially all the volatile solvent, whereby to provide an oleoresinous concentrate formed in situ in intimate association with the particles of the carrier base, whereby to produce a stable dry finely divided seasoning presenting the natural red pepper taste and odor, strong bite and stable color.

10. The method which comprises neutralizing a commercial fluid acetone extract of red peppers containing about 10% oleoresin with a mild non-toxic alkaline material to produce a pH of 7.0 to 8.5, mixing the neutralized extract with common sugar in a ratio to give 1 oz. to 8 oz. of oleoresin for 16 lbs. of sugar, and heating the mixture below 145° F. to free it from acetone.

11. The method which comprises neutralizing an oleoresinous extract of red peppers in a volatile solvent with a non-toxic, mild, alkaline agent to produce a pH of 7.0 to 8.5 therein, heating the mixture under a high vacuum and below a temperature of 160° F. and continuing the heating until the material is free from solvent.

12. The method which comprises treating a fluid acetone extract of red peppers containing dissolved in acetone about 10% of oleoresinous material extracted from red peppers by acetone with neutralizing material to render the extract substantially non-acid at a pH not over 8.5, mixing the resulting extract with finely divided particles of sugar to give approximately 1 to 8 ounces of oleoresinous material to 16 lbs. of sugar, and heating the mixture to remove acetone, whereby to concentrate the oleoresin in intimate association with the sugar.

CARROLL L. GRIFFITH.
LLOYD A. HALL.